No. 625,018. Patented May 16, 1899.
J. CALDWELL.
CULTIVATOR.
(Application filed Jan. 3, 1899.)
(No Model.) 2 Sheets—Sheet 1.

Witnesses:
C. F. Bartholomees.
F. S. Thrasher.

Inventor:
J. Caldwell
By Higdon, Fischer & Thorpe
Attys.

No. 625,018. Patented May 16, 1899.
J. CALDWELL.
CULTIVATOR.
(Application filed Jan. 3, 1899.)//
(No Model.) 2 Sheets—Sheet 2.
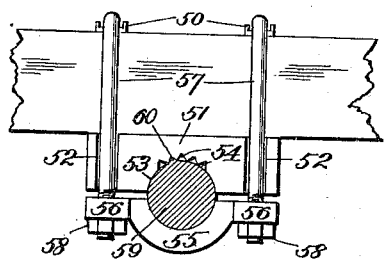
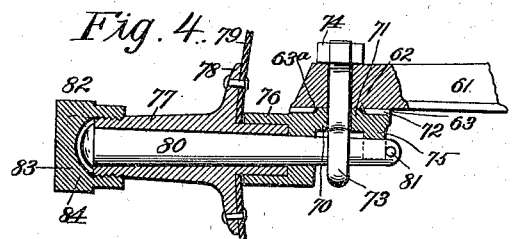
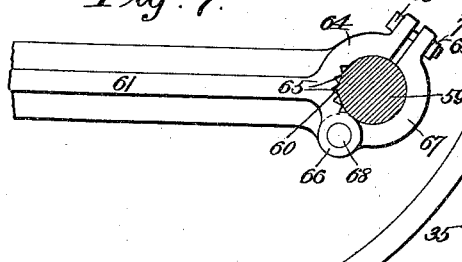
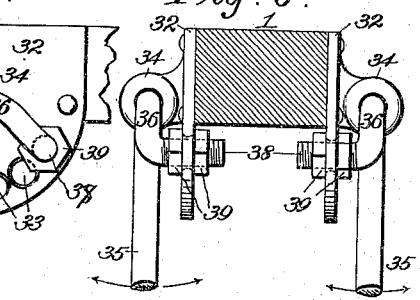
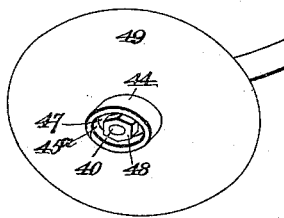
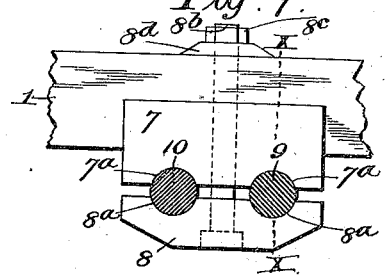
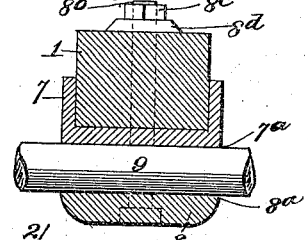
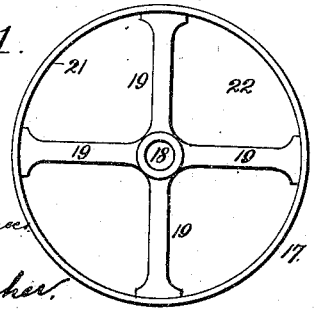
Witnesses
C. F. Bartholomew
F. S. Thrasher
Inventor:
J. Caldwell
By Rigdon, Fischer & Thorpe
attys.
THE NORRIS PETERS CO., PHOTO-LITHO., WASHINGTON, D. C.

UNITED STATES PATENT OFFICE.

JACK CALDWELL, OF KANSAS CITY, MISSOURI.

CULTIVATOR.

SPECIFICATION forming part of Letters Patent No. 625,018, dated May 16, 1899.

Application filed January 3, 1899. Serial No. 700,948. (No model.)

*To all whom it may concern:*

Be it known that I, JACK CALDWELL, of Kansas City, Jackson county, Missouri, have invented certain new and useful Improvements in Cultivators, of which the following is a specification.

My invention relates to what may be termed "universal" cultivators, adapted to be used for cultivating listed or ridge corn, cotton, or potatoes; and my object is to produce a machine of this character whereby the earth may be cultivated within an inch or two of the plants or at a greater distance, which may be adjusted to cultivate rows of varying widths or at varying depths, wherein the shield or fender will ride over obstructions insurmountable to the ordinary shields or fenders, and which embodies simplicity, strength, and durability of construction.

Other objects of the invention will hereinafter appear and be pointed out in appended claims.

To this end the invention consists in certain novel and peculiar features of construction and combinations of parts, as will be hereinafter described and claimed; and in order that it may be fully understood reference is to be had to the accompanying drawings, in which—

Figure 1:
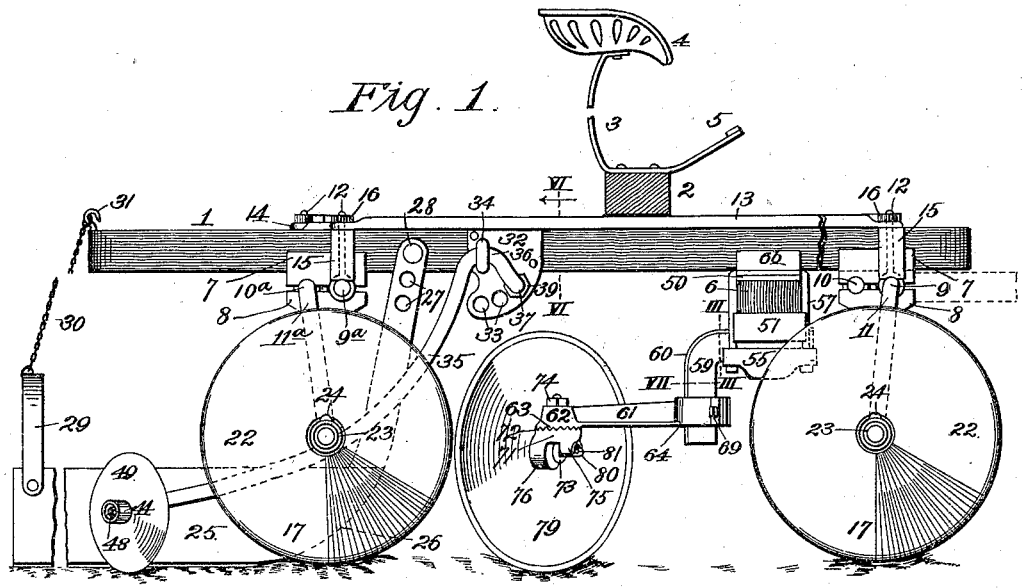
Figure 2:
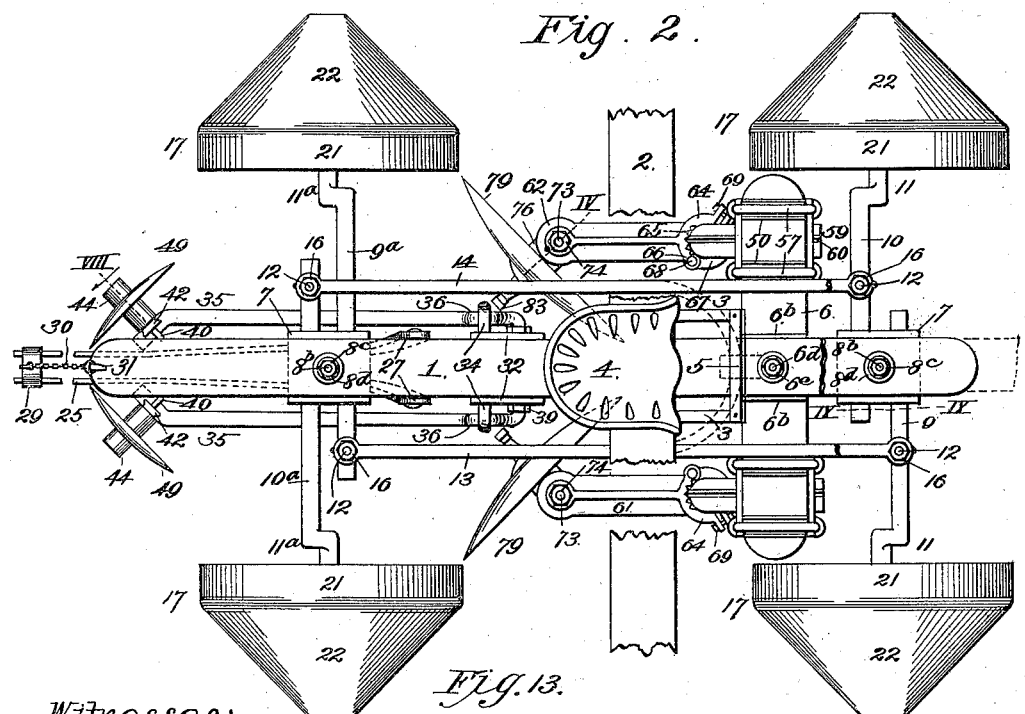
Figure 13:
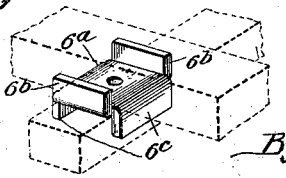

Figure 1 represents in side elevation mainly a cultivator embodying my invention. Fig. 2 is a top plan view of the same, partly broken away. Fig. 3 is a section taken on the line III III of Fig. 1. Fig. 4 is a section taken on the dotted line IV of Fig. 2. Fig. 5 is a detail, enlarged, of the mechanism for feeding loose earth to the plants under cultivation. Fig. 6 is an enlarged cross-section taken on the line VI VI of Fig. 1. Fig. 7 is an enlarged horizontal section taken on the dotted line VII of Fig. 1. Fig. 8 is an enlarged section taken on the dotted line VIII of Fig. 2. Fig. 9 is a section taken on the line IX IX of Fig. 2. Fig. 10 is a section taken on the line X X of Fig. 9. Fig. 11 is an inner face view of one of the carrying-wheels of the cultivator. Fig. 12 is a view showing the same in section. Fig. 13 is a detail perspective illustrating the plate provided with oppositely-projecting ears for securing certain timbers at right angles to each other.

In the said drawings, where like reference-numerals refer to corresponding parts, 1 designates a timber forming the backbone of the machine, and 2 a transverse plank mounted upon the same, which when the machine is in the form of a double or triple row cultivator is of sufficient length to bridge the space between the gangs in order that the weight may be equally distributed upon them all in the customary manner. 3 designates the springs secured to said plank and carrying at their upper ends the seat 4 and at their forward or lower ends the cross-bar 5, which forms a foot-rest for the driver.

6 designates a cross-beam underlying the longitudinal timber or backbone 1 forward of the plank 2, and $6^a$ a plate interposed between the timbers 1 and 6 and provided with upwardly-projecting ears $6^b$, embracing opposite sides of timber 1, and depending ears $6^c$, embracing opposite sides of cross-beam 6, so as to hold said beams at right angles to each other. The beams are secured reliably in such relation by means of the bolt $6^d$, engaged at its upper end by a clamping-nut $6^e$, a washer being interposed, as usual, between the nut and backbone-timber 1.

7 designates U-shaped castings, in which the backbone-timber 1 is seated at suitable distances from its front and rear ends, provided in their under sides with the transverse circular bearing-cavities $7^a$.

8 designates caps provided with companion grooves $8^a$, and $8^b$ bolts which extend up through the center of the caps, the castings, and the backbone-timber and are engaged at their upper ends by clamping-nuts $8^c$, the usual washers $8^d$ being interposed between the timbers and the nuts. These castings 7 and caps 8 constitute journal-boxes for the wheel-carrying shafts.

9 $9^a$ designate parallel oppositely-projecting shafts mounted in the foremost bearing-cavities $7^a$ $8^a$ of their respective journal-boxes, and 10 $10^a$ designate similar parallel oppositely-projecting shafts journaled in the bearing-cavities $7^a$ $8^a$ of their respective journal-boxes, the shafts 9 and 10 being provided at their outer ends with cranks 11 and the shafts $9^a$ $10^a$ with similar cranks $11^a$. These shafts are braced so as to form practically rigid arms projecting laterally from the backbone, the brace connection being effected as follows: 12 designates eyebolts through which the said shafts are threaded and upon the upwardly-projecting stems of which the tie-bars 13 and 14, connecting, respectively, shafts 9 9$^a$ and 10 10$^a$, are mounted, elongated washers or sleeves 15 encircling the tie-bolts and interposed between the shafts and the bars 13 14, so as to hold the latter at the proper relative distance from the shafts, and clamping-nuts 16 engaging the upper ends of said bolts, so as to clamp said tie-bars reliably in such position.

17 designates the wheels of my improved cultivator. Each wheel consists of a hub portion 18, from which project outward the long arms 19 and short arms 20, said arms being preferably cast integral with the hub, with their outer ends enlarged and extending, respectively, parallel with and at an angle to the hub. The outer or tread surface of the wheel is formed of sheet metal, with a straight portion 21 and a conical portion 22, the former fitting upon the outer or enlarged end of the arms 19 and the latter upon the inclined outer ends of the short arms 20, the tire being by preference shrunk upon said arms in a well-known manner, so as to obviate the necessity of rivets and therefore produce a stronger and more durable wheel, practically an indestructible wheel. The flat portion 21 when cultivating listed corn forms, mainly, the tread surface of the wheel, while the conical portion, together with said flat portion, crushes and pulverizes the clods of earth as they are successively encountered. When the wheel is used in cultivating cotton, potatoes, or ridge corn, the conical surface in the main forms the tread-surface, rolling along the side of the hill or ridge, and at the same time performs its crushing and pulverizing function. These wheels are journaled upon cranks 11 11$^a$, and fitting upon the outer ends of said cranks are collars 23, removable cotters or pins 24 extending through said collars and said cranks to hold the wheels reliably in position.

25 designates a shield or fender in the shape of a sled, consisting of two sides or runners, having their forward ends rounded, as at 26, in the customary manner and formed with or attached to the lower ends of the bars 27, pivoted at their upper ends, as at 28, to the backbone-timber 1, this arrangement of the parts permitting the sled to rise sufficiently high to clear obstructions, such as large rocks or tree-stumps, insurmountable to ordinary sleds or fenders which are pivoted close to the ground. A bail 29, pivotally mounted upon the shield or fender at its rear end, is connected by a chain 30 with the hook 31, secured to the backbone, and the length of said chain is such that the sled is raised slightly at its rear end, so as to leave a narrow space, through which loose earth in limited quantities may be fed to the plants in a manner hereinafter explained.

32 designates a pair of plates, bolted or otherwise secured to the opposite sides of the backbone and each provided with a segmental series of apertures 33 and an eye or loop 34.

35 designates a pair of spring-rods, bent near their upper ends to form the hooks 36, threaded through said eyes or loops 34, and inwardly-projecting bolt extensions 38, extending through one or another of said perforations 33, said bolt extensions being engaged by nuts 39, bearing against opposite sides of plates 32. By this construction it will be seen that the proper manipulation of nuts 39 will cause the hook portions 36 to rotate in the eyes or loops 34, (see Fig. 6,) and thereby swing the body portion of the rods 35 inward or outward, said nuts locking the rods reliably at any desired point of adjustment.

When it is desired to vertically adjust the lower ends of the spring-rods 35, the bolt extensions 38 are first disengaged from the apertures of plates 32 in order that said rods may be pivotally operated in a vertical plane with the eyes or loops 34 as the fulcrum-points. When the desired adjustment is obtained, the bolt extensions are caused to engage the registering perforations 33 and the nuts 39 screwed against opposite sides of the plates, it being understood, of course, that to withdraw said bolt extensions from the plates it is necessary first to remove the inner nuts 39 entirely.

40 designates an eyebolt which is threaded upon the rear and lower end of each spring-rod 35, and 41 a collar mounted thereon and provided with a cup or bell shaped extension 42, snugly embracing the head of the bolt.

43 designates a thimble or sleeve which fits snugly upon each bolt 40 and bears at one end against the collar.

44 designates a hub journaled upon each thimble or sleeve 43 and provided with recesses 45 45$^a$ in its opposite ends, to the end that either of said recesses may fit over the collar 41 and provide a joint, which renders the bearing-surface between the thimble or sleeve and the hub practically inaccessible to dirt. The hub is provided with an annular flange 46, to which is riveted or otherwise secured the disk 49 of the usual form, and said hub is held reliably in position by means of the washer 47 and clamping-nut 48, the latter engaging the threaded end of the bolt and clamping the plate immovably on the rod by the pressure of the collar at the opposite or outer side of the rod and incidentally clamping the washer and collar against opposite ends of the thimble or sleeve, so as to leave the hub free to rotate between said parts with the least friction practicable. When the earth is to be turned in one direction, as when cultivating listed corn, the hub is arranged with the concave side of the disk toward the plants; but when cultivating cotton, for instance, the position of the disk relative to the plant is reversed, this reversal of the disk being accomplished by simply reversing the position of the hub upon the thimble or sleeve, as will be readily understood. If it is desired to throw more or less earth toward or away from the plants, the nuts 48 can be loosened slightly, so as to permit the bolts 40 to be swung up or down, as indicated by arrows, Fig. 8, upon the rod 35, this adjustment of course causing a corresponding change in the position of the disk. This relation can be secured by screwing the nuts 48 home upon the eyebolts, thereby clamping the rods 35 between the heads of said bolts and the cup-shaped extensions of collars 41, as will be readily understood. Owing to the fact that the rods 35 are of spring metal, it is obvious that the disks 45 will yield and ride over any ordinary obstructions which lie in their path and after the obstruction is passed will automatically resume their original or operative positions.

50 designates two pairs of parallel grooved wear-plates mounted upon the cross-beam 6 at opposite sides of the backbone. 51 designates the upper members of the boxes which underlie the cross-beam below said wear-plates. Said members are wider than said cross-beam and are provided with vertical grooves 52 in the same vertical plane as plates 50 and each centrally with a journal-groove 53, having offsetting V-shaped notches 54.

55 designates the lower or cap member of each box, said member being of semicircular form to provide, in conjunction with the groove 53, a circular journal-opening, and with ears 56, through which extend the legs of the inverted stirrups 57, fitting also in the grooved wear-plates 50 and in the vertical grooves 52 of the upper box member 51, clamping-nuts 58 engaging the lower threaded ends of the stirrups to clamp the cap member firmly up against the horizontal arm of the cylindrical L-iron 59, said "iron" being provided for its full length with a V-shaped rib 60, adapted for engagement with one of the V-shaped notches 54 (see Fig. 3) in order to absolutely lock the iron from rotatable movement.

61 designates arms provided at their rear ends with vertically-perforated bosses or enlargements 62, having their under sides radially corrugated, as shown at 63, the corrugations terminating before they reach the perforation in order to form the cavity or recess 63ª, for a purpose which hereinafter appears. The front ends of said arms (see Fig. 7) are in the form of half-collars 64 to embrace the vertical or pendent arms of the L-irons 59 and having a series of V-shaped notches 65 for engagement with the said ribs 60 of said L-irons. At the inner sides of the arms 61 the half-collars 64 are formed with ears 66, to which the companion half-collars 67 are pivoted, as shown at 68, the free ends of the last-named collars being connected to the opposite ends of half-collars 64 by means of bolts 69 and clamping-nuts 69ª, this connection being utilized to clamp the arms 61 firmly and reliably upon the L-irons at any desired angle—that is to say, they may extend straight rearward, as shown at Fig. 2, or may diverge or converge rearwardly—at the will of the person in charge, the engagement of the ribs 60 with one or another of the notches 65 preventing any rotatable movement of arms 61.

70 designates a plate provided with a central upwardly-projecting boss 71 and radially corrugated, as at 72, outward of said boss, the latter being adapted to fit snugly in the cavity or recess 63ª of the superposed arm 61, with the corrugated surfaces 63 72 in mutual engagement, this connection being made secure by means of an eyebolt 73, extending up through the plate 70 and the registering perforation of arm 61, and engaged at its upper end by a clamping-nut 74. Each plate 70 is, furthermore, provided with a bifurcated arm 75 and diametrically opposite the same with a tubular arm or cap 76, the base of the cap being perforated in alinement with the bifurcation of the arm 75.

77 designates a sleeve or hub cast upon a graphite core, so that when said core is removed it leaves the conical opening of the hub with a graphite or self-lubricating surface, whereby the hub may rotate upon its shaft, hereinafter described, with little friction. This hub is provided with an annular flange 78, to which is riveted or bolted the earth-turning disk 79, which when the end of the hub is fitted in the socket of the tubular arm or cap 76 is interposed snugly between the flange 78 and the end of said arm or cap in order to exclude dirt as far as possible, and it will be noted in this connection that this bearing is practically dust-proof, as no dust has access to the journal unless it works its way to the base of the socket in which the hub is journaled, (see Fig. 4,) which is practically impossible.

80 designates a conical steel shaft on which the lubricated hub 77 is journaled, and said shaft extends through the opening in the base of said cap, through the eye of the bolt 73, and through the bifurcated arm 75 and is held reliably in this position by means of the cross-pin 81 and the head or enlargement 82, bearing against the end of the hub.

83 designates a threaded cap which envelops the head 82 and is screwed upon the hub, said cap being formed hollow, so as to provide a comparatively large chamber 84 to contain a lubricant which will gradually work its way along the shaft, and thereby automatically lubricate the same.

The disk 79 and the parts just described in connection therewith are in duplicate, one being connected to each arm 61, and by this construction it is obvious that said disks 79 may be rotated, with the bolts 73 as their axes, either in or out, as conditions shall render necessary or desirable, the clamping-nut 74 by clamping the corrugated surfaces 63 72 together through the instrumentality of the bolts 73 serving to reliably secure the disks at the desired angle. If it be desired to vary the distance materially between said disks, it may be most easily accomplished by adjusting the arms 61 upon the vertical arms of the L-irons 59. The disks may be adjusted vertically by sliding said arms 61 up or down upon the vertical arms of said L-irons and clamping them at the required point, or the disks may be simultaneously raised and laterally adjusted by rotating the horizontal arms of the L-irons in the journal-boxes, as hereinbefore described. Thus it will be seen that the construction described gives practically a universal adjustment to the disks 79 to the end that any and all requirements of the soil or plants under cultivation may be accommodated.

If necessary or desirable at any time that the frame be lowered, it can be accomplished by loosening nuts $8^c$ and rotating the shafts 9 $9^a$ and 10 $10^a$ properly, said nuts being again tightened, so as to clamp said shafts rigidly in their new positions. The adjustment of said shafts does not affect their connection by the tie-rods 13 14 owing to the fact that the shafts rotate freely in the eyebolts 12.

In practice the conical wheels travel in line with the earth-turning disks and not outward thereof, as shown for convenience of illustration in Fig. 2, and crush and pulverize clods before contact therewith of the disks. In cultivating listed corn practically the entire surface of said wheels acts as a tread-surface and as a clod crusher and pulverizer and having no arms or projections slips by stones, stumps, or other obstructions which would necessitate a detour or stoppage in the case of other machines. Furthermore, said wheels act as a guide and concentrate the machine in the furrow, thereby obviating the necessity of using runners. The wheels are adjustable to any width of furrow or ridge, being arranged as shown in the drawings when cultivating listed corn or sugar-cane. When cultivating ridge corn, potatoes, or cotton, the positions of the wheels upon the shafts are reversed—that is to say, the apex of the crusher projects inward instead of outward—that said crusher-surface may roll along the sides of the ridge. It will be noticed also that the backbone 1 and cross-beam 6 constitute the framework of this machine and that for this reason the disks 79 can be run close together, which cannot be accomplished where a sled is employed between the disks. The advantage lies in the fact that work is facilitated, as the necessity for going over the same row twice is thereby obviated.

The disks 49, as hereinbefore stated, are adapted when cultivating listed corn to feed loose earth under the shield or fender, which protects the plants from clods and from being smothered or buried in the loose earth.

In some cases it may be advisable to substitute a pivotal connection between the cross-beam 6 and the backbone 1 in lieu of the rigid connection shown and described. In this instance the tie-rods 13 14 instead of extending forward and being connected to the front shafts, as shown, are in the form of a U-shaped rod, as indicated by dotted lines, (see Fig. 2,) the U-shaped front end of said rods extending slidingly through the clip, (also shown in dotted lines, Fig. 2.) With a cultivator thus coupled it is obvious that listed corn or other plants arranged in curving rows may be cultivated without difficulty. It will also be noticed that owing to the fact that this machine has only a rolling contact with the ground it will be of comparatively light draft and can be operated by a pair of horses with no more exertion than a sled-cultivator can be operated by a double team.

From the above description it will be apparent that I have produced a cultivator which is practically universal; and it is to be understood that while I have shown the preferred embodiment of the invention I reserve the right to make all changes that properly fall within its spirit and scope.

Having thus described the invention, what I claim as new, and desire to secure by Letters Patent, is—

1. In a cultivator, a backbone, journal-boxes underlying the same and comprising upper flange members embracing the bottom and sides of the backbone and provided with parallel journal-grooves in their under sides, and lower or cap members provided with corresponding grooves, crank-shafts fitting in said companion grooves and provided with carrying-wheels, bolts extending up through said journal-boxes, and clamping-nuts engaging their threaded ends, substantially as described.

2. In a cultivator, a backbone, journal-boxes underlying and secured to the same, a pair of shafts secured to each box and projecting outwardly therefrom, wheels journaled on said shafts, eyebolts mounted upon said shafts, tie-bars connecting said eyebolts, washers or sleeves upon said eyebolts between said tie-bars and said shafts, and clamping-nuts engaging the ends of said eyebolts and clamping the sleeves or washers, the shafts and the tie-bars firmly together, substantially as described.

3. In a cultivator, a wheel-supported backbone, cultivating-disks arranged below and connected to the same, earth-feeding disks trailing behind the cultivating-disks, and a shield or fender for the appliance arranged between the earth-feeding disks and provided with upwardly-projecting arms at its front end pivoted to the backbone, substantially as described.

4. In a cultivator, a backbone, plates secured to the same and provided with perforations, spring-rods carrying earth-feeding disks at their lower ends and pivotally connected to said plates near their upper ends and terminating at such ends in inwardly-projecting threaded arms extending through said perforations, and nuts engaging said threaded arms at opposite sides of said plates, substantially as described.

5. In a cultivator, a backbone, plates secured to opposite sides of the same and provided with eyes or loops and segmental series of perforations, and spring-rods carrying earth-feeding disks at their lower ends and hooked pivotally near their upper ends in said eyes or loops; said hooks terminating in inwardly-projecting arms engaging certain of said perforations, substantially as described.

6. In a cultivator, a backbone, plates secured to opposite sides of the same and provided with eyes or loops and segmental series of perforations, spring-rods carrying earth-turning disks at their lower ends and hooked pivotally near their upper ends in said eyes or loops; said hooks terminating in inwardly-projecting threaded arms engaging certain of said perforations, and nuts engaging said threaded arms at opposite sides of the plates, substantially as described.

7. In a cultivator, a backbone, a spring-rod carried thereby, an eyebolt mounted upon said rod, a collar upon said eyebolt and provided with a cup-shaped extension embracing the head of the bolt and said rod, a thimble or sleeve upon said bolt and bearing at one end against said collar, a washer upon said bolt, a nut clamping the same against the outer end of the thimble or sleeve, and a disk journaled upon said thimble or sleeve between said collar and washer, substantially as described.

8. In a cultivator, a backbone, a spring-rod carried thereby, an eyebolt mounted upon said rod, a collar upon said eyebolt and provided with a cup-shaped extension embracing the head of the bolt and said rod, a thimble or sleeve upon said bolt and bearing at one end against said collar, a washer upon said bolt, a nut clamping the same against the outer end of the thimble or sleeve, and a disk provided with a hub journaled upon said thimble or sleeve and recessed at its opposite ends to receive the collar and the washer and clamping-nut, substantially as described.

9. In a cultivator, a suitable frame, a journal-box underlying the same, comprising an upper member provided in its under side with a semicircular groove having offsetting notches, and vertical grooves at opposite sides of the semicircular groove, and a lower or cap member, an arm being between said members and provided with a longitudinal rib engaging one of the said offsetting notches, inverted stirrups depending from the frame through said vertical grooves and projecting through the cap member, and nuts engaging the stirrups to clamp said arm between said members, substantially as described.

10. In a cultivator, a suitable frame, a pair of grooved plates thereon, a journal-box underlying the frame, comprising upper member having vertical grooves in alinement with said grooved plates, and a semicircular groove with offsetting notches in its under side, and a cap member, an arm fitting between said members and provided with a longitudinal rib engaging one of the said offsetting notches, inverted stirrups fitting in said grooved plates and in the vertical grooves of said upper member and extending through the cap member, and clamping-nuts engaging the lower ends of said stirrups, substantially as described.

11. In a cultivator, a suitable frame, an arm carried thereby and provided with a rib, a disk-carrying arm formed at one end with a half-collar embracing said arm and provided with an internal notch engaging the rib of said arm, a semicircular cap pivoted at one end to said half-collar, a bolt extending through the opposite ends of said half-collar and said cap, and a clamping-nut engaging the threaded end of said bolt, substantially as described.

12. In a cultivator, an arm suitably supported, a bolt carried thereby, a casting journaled on said bolt and clamped against said arm, a shaft secured to said casting, and a wheel or disk journaled on said shaft, substantially as described.

13. In a cultivator, an arm suitably supported, a bolt carried thereby, a casting journaled on said bolt and clamped against said arm, a shaft secured to said casting, a wheel or disk journaled on said shaft, and a cap enveloping the outer end of the shaft and secured upon the hub of the wheel or disk, substantially as described.

14. In a cultivator, an arm suitably supported, an eyebolt carried thereby, a casting journaled upon said bolt and clamped against said arm, a shaft threaded through said eyebolt and secured to said casting, and a wheel or disk journaled on said shaft, substantially as described.

15. In a cultivator, an arm suitably supported, an eyebolt carried thereby, a casting journaled upon said bolt and provided with a cap and bifurcated arm, a shaft extending through said cap, said eyebolt, and fitting in the bifurcation of said arm, means to secure the shaft in such position, and a wheel or disk journaled on said shaft and having one end of its hub entering said cap, substantially as described.

16. In a cultivator, an arm terminating in a boss provided with a vertical passage and radial corrugations at its under side, a plate provided with mating corrugations engaging those of the arm, and at diametrically opposite points with a bifurcated arm and a tubular arm or cap, an eyebolt extending up through said plate and arm and engaged by a clamping-nut at its upper end, a shaft extending through said cap, bifurcated arm, and the head of the interposed eyebolt, and provided with a head at its outer end and a cross-pin at its inner end bearing against said bifurcated arm, a disk journaled upon said shaft and having its hub projecting into the tubular arm or cap so as to exclude dirt from the bearing, and having its opposite end engaged by the head of the shaft, and a hollow cap secured upon the outer end of the hub
5 and provided with a lubricant-chamber, from which the lubricant may work its way along said shaft, substantially as described.

In testimony whereof I affix my signature in the presence of two witnesses.

JACK CALDWELL.

Witnesses:
M. R. REMLEY,
F. S. THRASHER.